United States Patent [19]

Bowen et al.

[11] Patent Number: 4,920,366
[45] Date of Patent: Apr. 24, 1990

[54] CONSTRUCTION OF AN OPTICAL FIBER WITH A CONNECTOR

[75] Inventors: Terry P. Bowen, Etters; Emil W. Deeg, Lemoyne; James G. Helm; Larry R. Stauffer, both of Camp Hill, all of Pa.

[73] Assignee: AMP Incorporated, Harrisburg, Pa.

[21] Appl. No.: 359,190

[22] Filed: May 31, 1989

[51] Int. Cl.$^5$ ................................................ G02B 6/36
[52] U.S. Cl. .................................... 350/96.20; 65/3.11
[58] Field of Search ........................... 350/96.20, 96.21; 65/3.11

[56] References Cited

U.S. PATENT DOCUMENTS

| | | | |
|---|---|---|---|
| 3,948,582 | 4/1976 | Martin | 350/96.21 |
| 4,148,554 | 4/1979 | Magnusson et al. | 350/96.21 |
| 4,186,999 | 2/1980 | Harwood et al. | 350/96.21 |
| 4,553,814 | 11/1985 | Bahl et al. | 350/96.21 |
| 4,598,974 | 7/1986 | Munn et al. | 350/96.21 |
| 4,669,820 | 6/1987 | Tenberge | 350/96.20 |
| 4,691,986 | 9/1987 | Aberson, Jr. et al. | 350/96.21 |
| 4,743,084 | 5/1988 | Manning | 350/96.21 |
| 4,815,809 | 3/1989 | Szostak | 350/96.20 |
| 4,820,322 | 4/1989 | Baumgart et al. | 65/3.11 |
| 4,826,376 | 5/1989 | Abbott et al. | 350/96.20 |

OTHER PUBLICATIONS

Optical Communications Systems, J. Gower, Prentice Hall, Englewood Cliffs, N.J., 1984, pp. 90-114.

Primary Examiner—William L. Sikes
Assistant Examiner—Akm E. Ullah
Attorney, Agent, or Firm—Gerald K. Kita

[57] ABSTRACT

A connector 1 for an optical fiber 2 comprising, an alignment body 3 and a length of optical waveguide 4 drawn into a unitary structure 18, and, while the length of optical waveguide 4 is unitary with the alignment body 3, the length of optical waveguide 4 is shortened by etching or abrading to provide a passage 5 in the alignment body 3 for receiving an external optical fiber 2 for coupling with the length of optical waveguide 4.

20 Claims, 3 Drawing Sheets

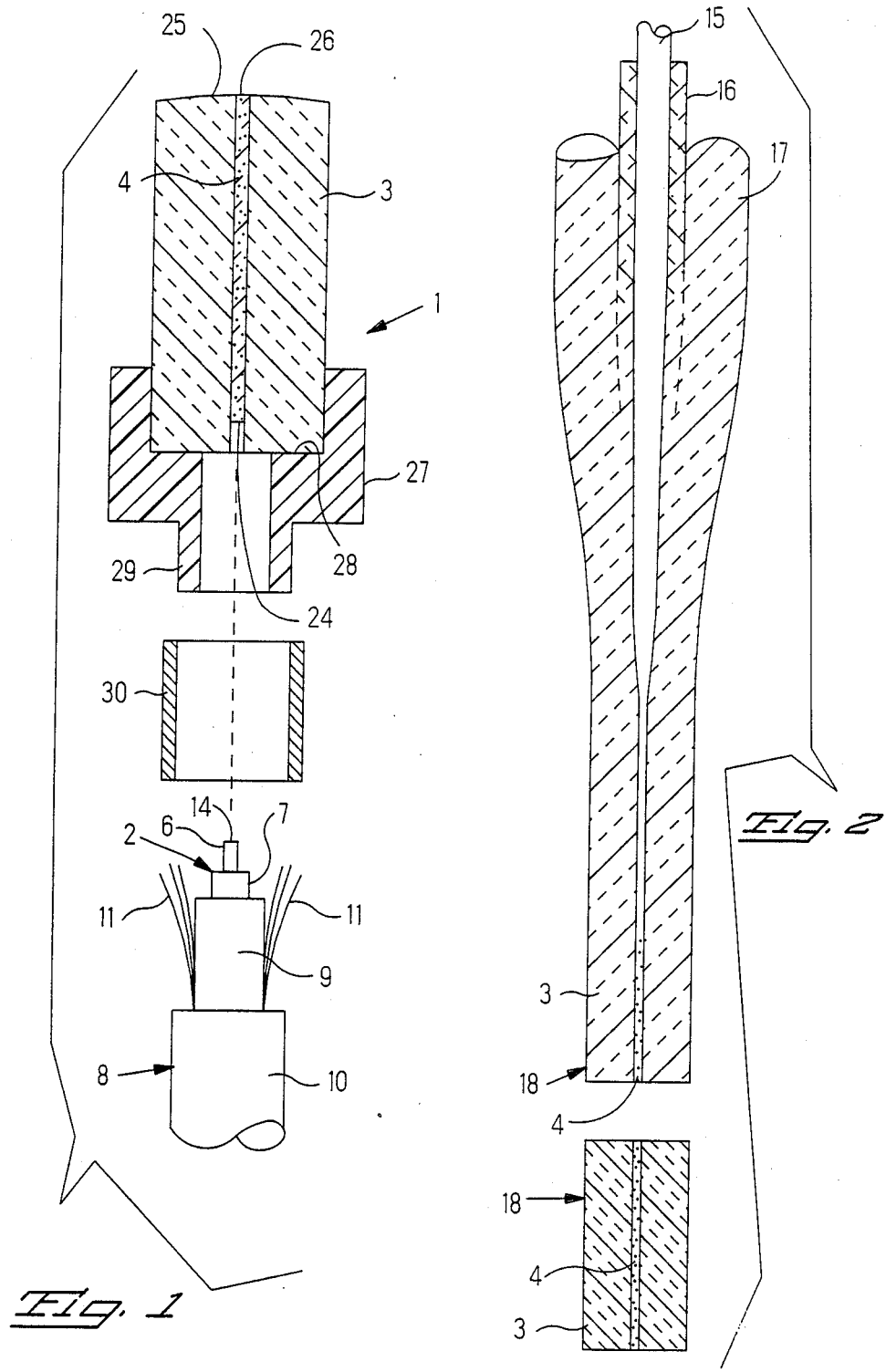

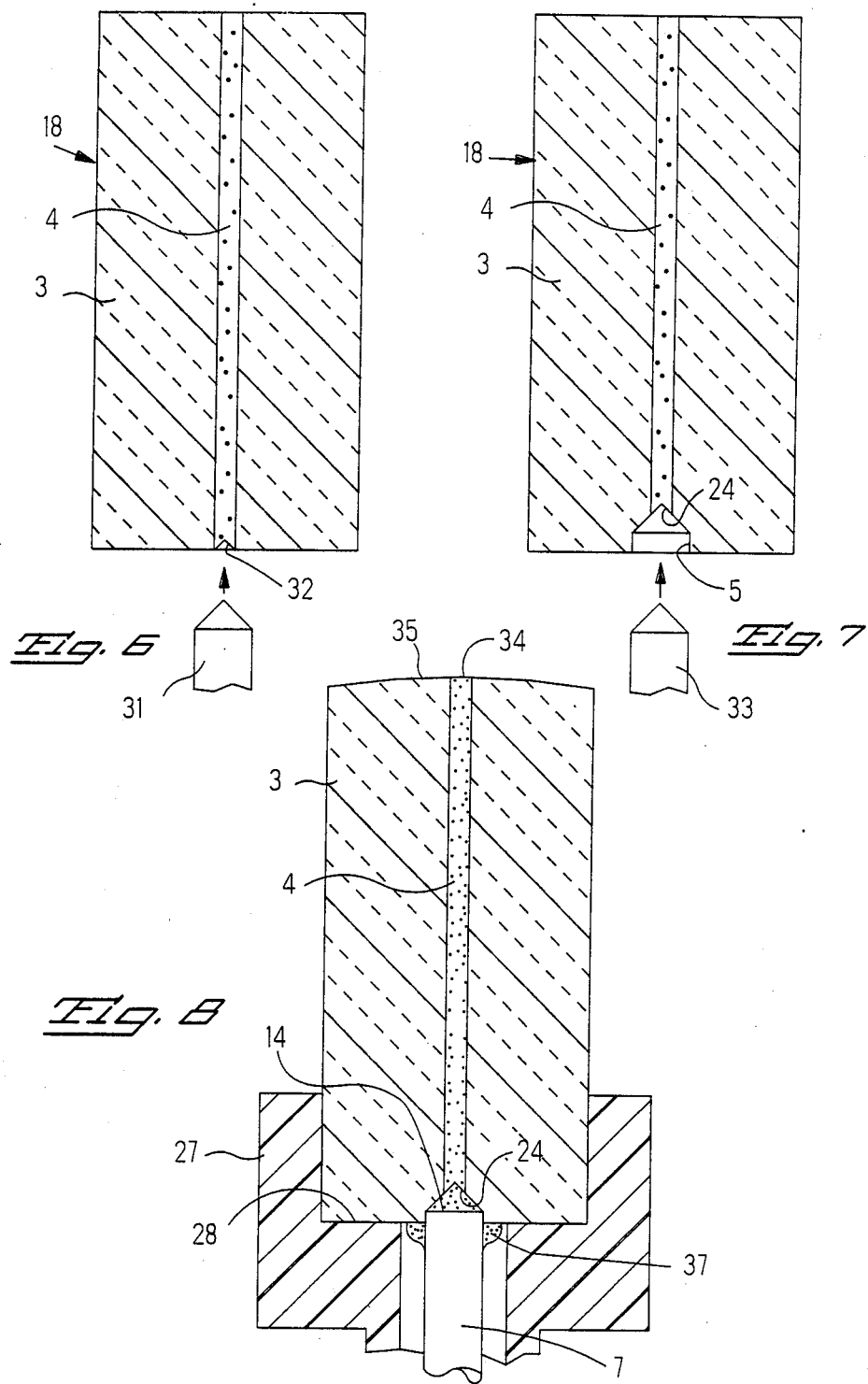

4,920,366

CONSTRUCTION OF AN OPTICAL FIBER WITH A CONNECTOR

FIELD OF THE INVENTION

The specification describes a connector for an optical fiber, wherein the connector includes a preinstalled length of optical fiber.

BACKGROUND OF THE INVENTION

A known connector for an optical fiber is disclosed in U.S. Pat. No. 4,743,084, and comprises, an alignment body, a length of optical fiber in the alignment body, and a passage in the alignment body receiving an optical fiber for optical coupling with the length of optical fiber.

The alignment body is manufactured with a bore in which the length of optical fiber is assembled. The optical fiber has a relatively small diameter, on the order of 9 microns to 12.5 microns. One manufacturing difficulty has resulted from a requirement to assure concentricity of the relatively small diameter bore with the alignment body. Another manufacturing difficulty has resulted from a requirement to maintain the diameter of the bore within a narrow range of dimensional tolerances. These manufacturing difficulties have resulted from the relatively small diameter of the optical fiber.

The manufacturing difficulties are reduced when the diameter of the optical fiber is enlarged. As disclosed in U.S. Pat. No. 4,669,820, an optical fiber is enlarged diametrically by a relatively thick layer of plated metal. The plated metal is deposited on an optical fiber to a desired diameter many times the diameter of the optical fiber.

A further manufacturing difficulty has resulted from a requirement to secure the length of optical fiber in the bore by an adhesive, as disclosed by U.S. Pat. No. 4,743,084, or by crimping, as disclosed by U.S. Pat. No. 4,669,820.

SUMMARY OF THE INVENTION

An objective of the invention is to eliminate manufacturing difficulties associated with securing an optical fiber within a relatively small diameter bore of an alignment body.

A feature of the invention resides in an optical waveguide fiber and an alignment body as a unitary structure. The unitary structure avoids difficult and costly construction of a relatively long, retaining fixture with a small diameter bore and subsequent separate assembly of an optical fiber in the bore.

Another feature of the invention resides in a length of optical waveguide being shortened while unitary with the alignment body to provide a passage for receiving an optical fiber for coupling to the length of optical fiber. The length of said alignment body and optical waveguide is shortened by an etched end face of the fiber recessed in the alignment body. The length of optical fiber is shortened by an abraded end face of the fiber recessed in the alignment body.

Another feature of the invention is a recessed passage in the waveguide portion of said unitary structure whereby said passage is cylindrical and coaxial with the waveguide.

A further feature of the invention is that the cylindrical passage acts as receptacle for an optical fiber with either the original diameter of the fiber or a chemically, mechanically, thermally, or by other means, reduced diameter.

According to a further feature of the invention, the recessed passage is generated by mechanical drilling, laser assisted etching, electron or ion beam sputtering or other suitable means.

A further feature of the invention resides in securing the end portion of an optical fiber in said passage by an index matching, polyuerizable substance.

According to a further feature, an abraded portion of the alignment body defines the passage with a diameter larger than a diameter of the length of waveguide.

These and other advantages, features and objectives of the invention are disclosed by way of example from the following detailed description and accompanying drawings.

DESCRIPTION OF THE DRAWINGS

FIG. 1 is an enlarged elevation view in section of an optical fiber and a connector for the fiber.

FIG. 2 is a diagrammatic view of a process for drawing preforms of optically transmissive material into an optical waveguide and cladding.

FIG. 6 is a diagrammatic view of a diamond drilling process.

FIG. 7 is a diagrammatic view of a counterbore drilling process.

FIG. 8 is a fragmentary elevation view in section of an optical fiber assembled with a connector manufactured by the processes illustrated in FIGS. 2, 6 and 7.

With reference to FIG. 1, a connector 1 for an optical fiber 2 includes an alignment body 3, and a length of optical waveguide 4, also known as a core, in the alignment body 3 for optical coupling with the optical fiber 2. The alignment body 3 is unitary with the length of optical waveguide 4, and the length of waveguide 4 is shortened while unitary with the alignment body 3 to provide a passage 5 in the alignment body 3 receiving the optical fiber 2 for optical coupling with the length of optical waveguide 4.

With reference to FIG. 1, the optical fiber 2 is manufactured by a glass drawing process described in numerous patent and text books; e.g., Gowar, J., Optical Communications Systems, Prentice Hall, Englewood Cliffs, NJ, 1984, pp. 90–114. According to the process of the literature, the optical fiber 2 can be manufactured with an optically transmissive glass material formed into a core 6 of 9 microns diameter and fused within a concentrically surrounding cladding 7 of optically transmissive glass material having an outer diameter of 12.5 microns.

As shown in FIG. 1, the optical fiber 2 is part of an optical cable 8. The fiber is assembled within a flexible polymeric sheath of enlarged diameter, called a buffer 9 that tends to restrict the optical fiber 2 from bending abruptly. An external jacket 10 of polymeric material surrounds the buffer 9. Elongated fibrous strength members 11 extend axially of the cable 8 and resist axial tension applied to the cable 8. A portion of the optical fiber 2 is exposed from and extends from the buffer 9. As shown in FIG. 4, a tip of the optical fiber 2 is immersed in an agitated etchant 12 in a vessel 13. The etchant 12 removes in a controlled fashion parts or all of the cladding 7 from the tip area. An end face 14 is acid polished to transmit optical energy with low reflection loss. The etchant 12 is an aqueous solution of hydrofluoric acid which may be buffered with ammonium fluoride Another useful etchant is a thin paste consisting of fuming, aqueous solution of hydrofluoric acid and powdered calcium fluoride also known as fluorite, or in a less pure form as fluorspar. The paste permits better control of etching rate than the hydrofluoric acid solutions without addition of calcium fluoride.

Advantageously, the alignment body 3 and the length of optical fiber 4 are manufactured by a rod/tube drawing process known to those skilled in glass manufacturing and similar to the process for manufacturing the optical fiber 2. With reference to FIG. 2, a preform rod 15 to become the core 4 of optically transmissive glass material is drawn, together with a preform tube 16 of optical cladding concentrically surrounding the core 4. The cladding is a glass material having approximately the same coefficient of thermal expansion, but a lower index of optical refraction than the material of the core. A second preform tube 17 of lower optical grade but compatible, in thermal expansion and viscosity versus temperature, with the first tube regarding non-optical properties, concentrically surrounds the tube 16 for the cladding.

Figure 3:
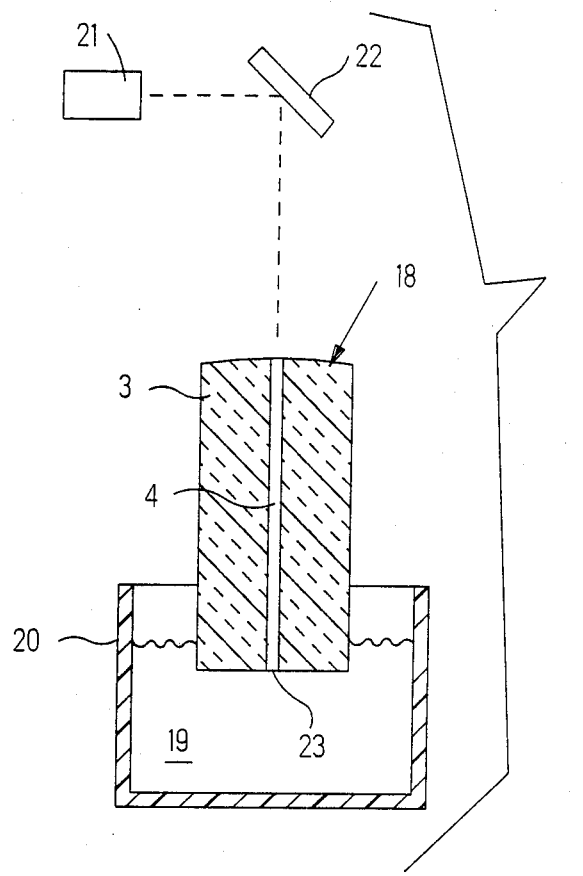
FIG. 3 is a diagrammatic view of a laser enhanced etching process for manufacture of the connector shown in FIG. 1.
Figure 4:
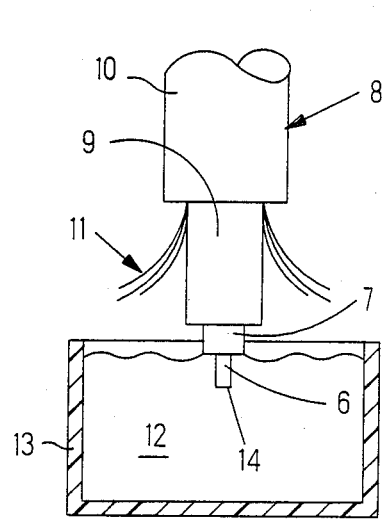
FIG. 4 is a diagrammatic view of an etching process for removing cladding from an optical fiber.

Upon drawing the preform composed of the rod 15 and the tubes 16, 17, their diameters are reduced, and the three components are fused together to provide a unitary structure 18 of a core 4 of 9 microns diameter and a cladding 3 of 1 mm. diameter. The ratio of the diameters of the cladding 3 and the core 4 are at least 9 to 1000. For a cladding 3 of 2.5 mm. the ratio is 9 to 25000. The ratio of the diameters of the rod 15 and the tubes 16,17 are maintained throughout the drawing process. The core 4 provides the length of optical waveguide 4 in the alignment body 3. The cladding 3 provides the alignment body 3. The optical refraction portion of the cladding 3 is composed of the material of the tube 16 fused to the core 4.

With reference to FIG. 2 and 3, a portion of the drawn unitary structure 18 is cut to length to provide the alignment body 3. In the unitary structure 18 shown in FIG. 2, the core is flush with the cladding. As shown in FIG. 3, one end of the unitary structure 18 is immersed in an etchant 19 contained in a vessel 20.

The etchant 19 is a 50% aqueous solution of hydrofluoric acid.

Figure 5:
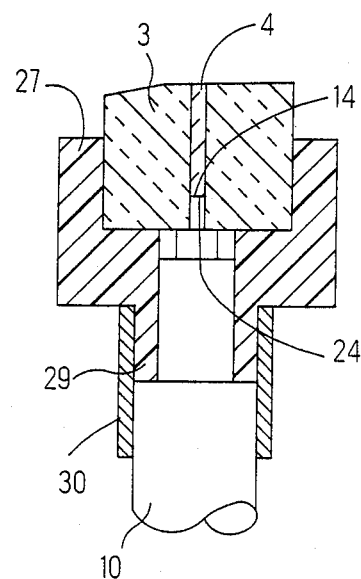
FIG. 5 is a fragmentary elevation view in section of an optical fiber assembled with a connector manufactured by the processes illustrated in FIGS. 2 and 3.

A high energy, pulsed laser 21, for example, a NdYAG laser, is aimed by an optical system 2 to transmit energy in optical form along the core to an end 23 of the core 4 that is immersed in the etchant 19. Etching of the end 23 is enhanced by localized interaction of the laser energy with the etchant 19 at the interface with the core 4. As a result, the core 4 is etched faster than the cladding 3. The core 4, comprising the length of optical fiber 4 in the alignment body 3, is shortened by an etched end face 24 of the core 4, FIG. 1, recessed in the alignment body 3. The end face 24 is simultaneously acid polished thus producing a polished surface that transmits optical energy with low loss. A shallow, recessed passage 5 of about 0.5 mm. in depth is provided in the alignment body 3. The passage 5 has a diameter sized and located by the portion of the core 4 removed by etching. An end 25 of the alignment body 3 and an end face 26 of the length of optical fiber 4 are polished according to known procedures, to provide the end 25 with a slightly convex shape, and to provide the end face 26 with an optical property of low scattering loss. As shown in FIG. 5, the optical fiber 2 is connected to the alignment body 3, and is optically coupled, end to end, with the length of optical fiber 4 in the alignment body 3. The exposed core 6 at the tip of the optical fiber 2 is coated with a polyurerizable index matching fluid; e.g., AT&T concode No. 4026G8302, and is inserted into the passage 5. The core 6 of the optical fiber 2 is substantially the same diameter as the length of optical waveguide 4, and thereby, fits concentrically in the sized passage 5. The diameter of the cladding 7 of the optical fiber 2 is larger than the diameter of the passage 5, and is prevented from entering the passage 5. The axis of the passage 5 is aligned with the polished end face 24 of the length of optical fiber 4. Subsequently, this assembly is cured at approximately 40° C. for two minutes. Consequently, the passage 5 aligns the polished end faces 14, 24 and, combined with the effect of the index match, provide a low loss optical coupling.

With reference to FIGS. 1 and 5, for example, one form of the connector 1 includes a rigid, stepped sleeve 27 of metal having an internal shoulder 28 against which the alignment body 3 engages and seats. For example, the body 3 is press fit in the sleeve 27 and is secured by a friction fit. A rear end portion 29 of the sleeve 27 is of reduced external diameter, and has an internal diameter sized between the diameters of the buffer 9 and the jacket 10.

The optical fiber 2 is assembled through a radially deformable crimp ring 30, and into and along the rear end portion 29, with the strength members 11 extending to the front and over the rear end portion 29. The crimp ring 30 is radially deformed to radially grip the cable jacket 10 and the clamp the strength members 11 against the rear end portion 29 of the sleeve 27.

With reference to FIGS. 6, 7 and 8, the unitary structure 18 as shown in FIG. 2 may be abraded, first with a single point diamond drill 31, FIG. 6, to provide a pilot hole 32 concentrically within an end of the core. As shown in FIG. 7, the pilot hole 32 centers a drill bit 33 that abrades the core 4 and the cladding 3 and provides a shallow, recessed passage 5 of about 0.5 mm. depth and a diameter of about 12.5 microns, essentially the same as the diameter of the optical fiber 2 including the cladding 7.

As shown in FIG. 8, the unitary structure 18 of FIGS. 6 and 7 is an alignment body 3 with a length of optical fiber 4. An optical end face 34 is provided on the length of the optical fiber 4 by polishing. An end 35 of the alignment body 3 is polished to a slightly convex shape. The alignment body 3 is assembled in a duplicate of the sleeve 27. The adhesive 36 in the passage 5 adheres to the end faces and forms a build up of adhesive 36 in a mechanical stress relieving, fillet 37 encircling the cladding 7 and a rear end of the alignment body 3 surrounding the cladding 7 and within the sleeve 27. The adhesive 36 has the same index of optical refraction as the optical fiber 2 and the length of optical waveguide 4. A low loss optical coupling is provided between the end faces 14, 24.

Each of the discussed advantages, features and objectives of the disclosed invention exists independently and contributes to the use and importance of the invention.

We claim:

1. A connector for an optical fiber comprising, an alignment body, and a length of optical waveguide in the alignment body for optical coupling with an external optical fiber, wherein the improvement comprises;

the alignment body is unitary with the length of optical waveguide, and the length of optical waveguide is shortened while unitary with the alignment body to provide a passage in the alignment body receiving therein an optical fiber for optical coupling with said length of optical waveguide.

2. A connector as recited in claim 1, wherein the improvement comprises; the length of optical waveguide is shortened by an etched end face of the waveguide recessed in the alignment body.

3. A connector as recited in claim 1, wherein the improvement comprises: an abraded end face of the length of waveguide recessed in the alignment body, and an abraded portion of the alignment body defines the passage with a diameter larger than a diameter of the length of the optical waveguide.

4. A connector as recited in claim 1, wherein the improvement comprises; the alignment body and the optical waveguide are optically transmissive materials having different indices of optical refraction, and similar coefficients of thermal expansion and viscosity versus temperature behavior.

5. A connector as recited in claim 1, wherein the improvement comprises: an end of the length of optical waveguide is polished flush with the alignment body.

6. A connector as recited in claim 1, wherein the improvement comprises: the alignment body and the length of optical waveguide are concentric, and a ratio of their diameters is constant.

7. A connector as recited in claim 1, wherein the improvement comprises; the alignment body is a tube of optical cladding fused with the length of optical waveguide.

8. A connector as recited in claim 1, wherein the improvement comprises; the alignment body is a first tube of optical cladding fused with the length of optical waveguide and a second tube of lower optical grade fused with the first tube.

9. A connector as recited in claim 1, wherein the improvement comprises; sleeve means in which the alignment body is secured, the sleeve means having a portion to receive an optical fiber for optical coupling with said length of optical waveguide.

10. A connector for an optical fiber comprising, an alignment body, and a length of optical waveguide in the alignment body for optical coupling with the optical fiber, wherein the improvement comprises;

the alignment body is formed with a tube of optical cladding fused unitary with the length of optical waveguide, a ratio of diameters of the length of optical waveguide to the alignment body is at least 9 to 1000, and sleeve means in which the alignment body is secured, the sleeve means having a portion to receive an optical fiber therein for optical coupling with the length of optical waveguide.

11. A connector as recited in claim 10, wherein the improvement comprises; the length of optical fiber is shortened by an etched end face of the fiber recessed in the alignment body.

12. A connector as recited in claim 10, wherein the improvement comprises; an abraded end face of the fiber recessed in the alignment body, and an abraded portion of the alignment body defines the passage with a diameter larger than a diameter of the length of optical fiber.

13. A connector as recited in claim 10, wherein the improvement comprises; an end of the optical fiber is polished flush with the alignment body.

14. A connector as recited in claim 10, wherein the improvement comprises; the alignment body and the length of optical fiber are concentric, and a ratio of their diameters is constant.

15. A connector as recited in claim 10, wherein the improvement comprises; the alignment body is a tube of optical cladding fused with the optical fiber.

16. A connector as recited in claim 10, wherein the improvement comprises; the alignment body is a first tube of optical cladding fused with the optical fiber and a second tube of lower optical grade fused with the first tube.

17. A method of making an optical connector wherein the improvement comprises the steps of:

drawing a flowable rod of optically transmissive core material within a flowable tube of optically transmissive cladding material with a lower index of refraction than the core material while maintaining corresponding diameters of the preforms at a constant ratio of at least 9 microns to 1 mm, shortening the core material when solidified and while the core material is unitary with the cladding material, to provide a passage in the cladding material for receiving therein an optical fiber in alignment with the core material.

18. A method as recited in claim 17, wherein the improvement comprises the steps of: shortening the core material by etching the core material, and providing an end face of the core material with an acid polished finish.

19. A method as recited in claim 17, wherein the improvement comprises the steps of; shortening the core material by abrading the core material, and enlarging the passageway by abrading the cladding material.

20. A method as recited in claim 17, wherein the improvement comprises the steps of: polishing an end of the core material flush with an end of the cladding material.

* * * * *

UNITED STATES PATENT OFFICE
CERTIFICATE OF CORRECTION

Patent No. 4,920,366                    Dated April 24, 1990

Inventor(s) Terry P. Bowen ET AL

It is certified that error appears in the above-identified patent and that said Letters Patent is hereby corrected as shown below:

Claim 3, Column 5, Line 15 after "of" insert --optical--.

Claim 4, Column 5, Line 20 after the second occurence of "the" insert --length of--.

Signed and Sealed this

Twenty-fourth Day of December, 1991

Attest:

HARRY F. MANBECK, JR.

*Attesting Officer*          *Commissioner of Patents and Trademarks*